United States Patent Office 3,524,961
Patented Aug. 18, 1970

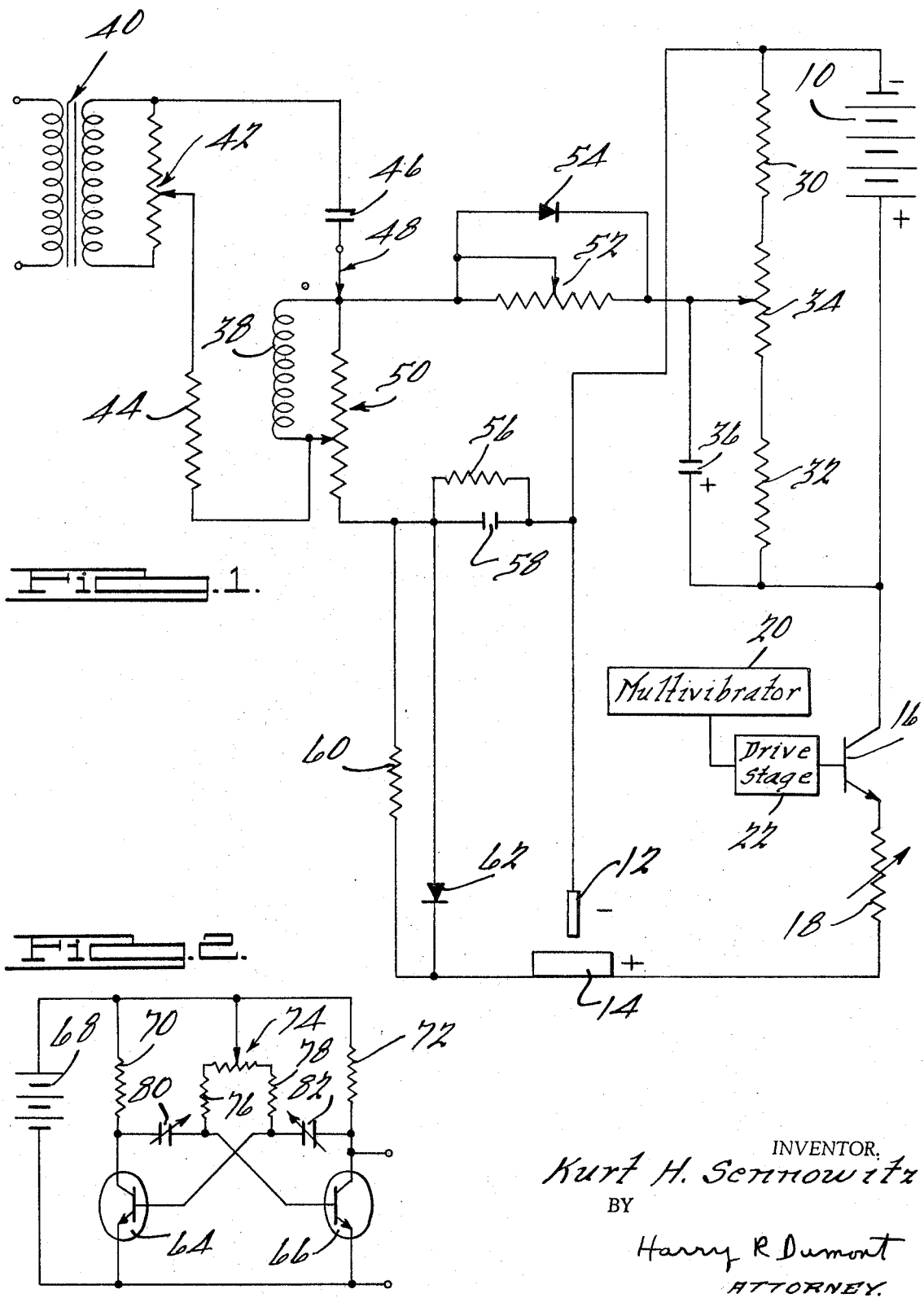

3,524,961
SERVOCONTROL CIRCUIT OF VARIABLE SENSITIVITY FOR ELECTRICAL DISCHARGE MACHINING APPARATUS
Kurt H. Sennowitz, Royal Oak, Mich., assignor to Elox Inc., Troy, Mich., a corporation of Delaware
Filed Jan. 22, 1968, Ser. No. 699,444
Int. Cl. B23p *1/14*
U.S. Cl. 219—69     10 Claims

ABSTRACT OF THE DISCLOSURE

A circuit for maintaining relatively constant gap spacing between an EDM electrode and a workpiece wherein provision is made for controlling the servo sensitivity of the circuit conjointly with changes made to machining pulse on-off time by ganging various parameter controllers. Servostability is further improved by coupling the servo coil to the gap through a capacitor bridged by a resistor of relatively high magnitude to provide delayed backup on gap short-circuit and to improve stability on downfeed.

BACKGROUND OF THE INVENTION

The field to which my invention relates is that known as electrical discharge machining, hereinafter sometimes referred to as EDM, in which material is removed from an electrically conductive workpiece by the action of electrical gap discharges across a machining gap. An electrode or workpiece servo feed system is employed to maintain an optimum gap spacing between electrode and workpiece as material removal is carried on. A dielectric coolant is continuously circulated through the gap as the machining operation is carried out. The machining pulse parameters used vary over a broad range insofar as gap current, frequency of pulses and their on-off time are concerned. It is particularly difficult to provide servo control circuit which is operable over these broad ranges without need for excessive operator adjustment.

SUMMARY OF THE INVENTION

My invention provides an improved servo feed control circuit for EDM in which loop impedance of the control circuit is adjusted relative to machining pulse on-time being used and in which improved stability is additionally insured by the mode of coupling of the servo control element to the gap.

BRIEF DESCRIPTION OF THE DRAWINGS

FIG. 1 is a partial diagrammatic-schematic showing of an EDM power supply circuit including the servo control circuit of my invention; and FIG. 2 is a schematic of a multivibrator particularly adapted for use in conjunction with the servo control circuit of FIG. 1.

DESCRIPTION OF THE DRAWINGS

With particular reference to FIG. 1, a main machining DC supply 10 is shown with its negative terminal connected to electrode 12. The positive terminal of DC supply 10 is connected to workpiece 14 through the power electrodes of transistor 16. A rheostat 18 is connected in series between the output of transistor 16 and the workpiece for regulating machining current magnitude. A multivibrator 20 and intermediate drive stage 22 are shown in block form. It will be seen that transistor 16 is periodically rendered conductive to generate machining pulses across the machining gap with the frequency of these pulses and their relative on-off time and hence power content regulated according to the operation of multivibrator 20. The mode of operation of multivibrator 20 and its construction will be explained in connection with FIG. 2 hereinafter.

The servo control circuit includes a reference voltage source which is, in the present instance, derived from main machining power source 10 by means of a shunt network including resistors 30, 32 and the variable resistance of potentiometer 34. A filter capacitor 36 is connected as shown. The basic control element in the circuit is electromagnetic servo valve control coil 38. The direction of electrode movement is controlled by the direction of current flow through coil 38. The full detail of hydraulic motor and servo valve are not shown herein in the interest of simplifying this disclosure. However, a number of suitable electrohydraulic EDM servo control systems are shown and described in Webb U.S. Pat. No. 3,230,412 issued on Jan. 18, 1966, entitled "Servo Feed Apparatus for Electrical Discharge Machining." Control coil 38 has a means for applying AC jitter across its terminals. This includes an AC source 40 which source is shunted by a potentiometer 42 and a series resistor 44. Also connected in series with the AC source 40 is a capacitor 46 and a switch 48 for selectively applying jitter to the control coil 38. A potentiometer 50 is coupled as shown in parallel with coil 38 to provide a velocity control for the servo. A rheostat 52 is connected in series between coil 38 and the reference voltage preset by potentiometer 34. The resistance of rheostat 52 is variable according to the multivibrator on-time. It will be seen that the movable contact of rheostat 52 controls the voltage across coil 38 and that the loop impedance is varied in acccordance with pulse on-time. The purpose and function of this arrangement will be clarified in the Description of Operation hereinafter and by the showing of FIG. 2. A fast back-up diode 54 is connected across rheostat 52 as shown. Coil 38 has its lower terminal operatively connected to the gap through a parallel resistor-capacitor network including resistor 56 and capacitor 58 with resistor 56 being of a relatively high magnitude. Resistor 60 and rectifier 62 are connected across capacitor 58 and the gap as shown.

FIG. 2 shows a variable on-off time multivibrator 20 suitable for use in connection with an EDM power supply incorporating my invention. Multivibrator 20 is of the astable type and includes a pair of transistors 64 and 66 each coupled to a drive voltage source 68 through a different load resistor 70, 72 respectively. A common return potentiometer 74 is connected in the circuit as shown with fixed resistors 76, 78 coupled as shown. Variable capacitors 80, 82 are coupled as shown and conjointly variable to preset the frequency of operation. The movable contact of potentiometer 74 is movable rightwardly or leftwardly to vary pulse on-off time. The output is taken across the collector-emitter of transistor 66 and passed through one or more following drive stages 22 to control the operation of output transistor 16. The ganged operation of potentiometer 74 of FIG. 2 and of rheostat 52 of FIG. 1 is of particular importance as will be further explained hereinafter.

DESCRIPTION OF OPERATION

The operation of the circuit begins with activating the power supply and multivibrator 20. In a typical roughing operation, initial machining is conducted with long on-time pulses, for example, with 95% duty factor. Finish machining is carried on with relatively short pulse on-time, perhaps of the order of 5% duty factor. It is exceedingly difficult to control servo feed over this broad range of variation. I have found that the servo circuit shown has the advantage of greater stability of cutting even at maximum on-time. With preference to FIG. 2, on-time is increased with the operation of potentiometer 74. Frequency may be preset by capacitors 80, 82. Then, as the tap on potentiometer 74 is moved from one extreme to the other, resistance is removed from one multivibrator RC network and transferred to the other. Thus, for example, as the tap of potentiometer 74 is moved to the right end of the variable resistance, on-time is increased, off-time is decreased and a constant repetition rate is maintained. It is an important feature of my invention that potentiometer 74 is operated conjointly, i.e., ganged with rheostat 52 of FIG. 1. Whenever on-time is increased by adjustment of potentiometer 74, the tap on rheostat 52 will be moved rightwardly so that the voltage across servo control coil 38 will be properly and automatically adjusted. At a maximum on-time setting of multivibrator 20, rheostat 52 will be placed in series circuit with coil 38 to change the loop impedance. The stability of my servo control circuit is further improved by reason of the mode of coupling of servo coil 38 directly to the gap through capacitor 58. Capacitor 58 is shunted by a relatively high resistor 56. There is present in the system a slight delay in back-up on short circuit which I have found to be of advantage. Switch 48 may be placed in its right-hand position to provide AC jitter across the coil when this is required. Velocity of the system is also controllable through the setting of potentiometer 50.

I claim:

1. In an electrical discharge machining apparatus for providing variable on-off time machining power pulses across a dielectric coolant filled gap between a tool electrode and a workpiece, servo means for controlling the gap spacing including a reversible motive means and an electrically energized element operatively connected to and controlling said motive means responsive to direction of current flow through said element wherein the improvement comprises a reference voltage source, said element connected in series with a parallel resistor-capacitor network between said reference voltage source and said gap, and a blocking diode and resistor each connected in shunt across the series combination of said network and said gap.

2. The combination as set forth in claim 1 wherein a velocity control potentiometer is connected with its variable resistor in shunt with said element.

3. The combination as set forth in claim 1 wherein a rheostat is coupled with its variable resistor in series between said element and said reference voltage source, said rheostat variable to increase the resistance in series with said element during relatively long on-time operation of said switch.

4. In an electrical discharge machining apparatus for providing variable on-off time machining power pulses across a dielectric coolant filled gap between a tool electrode and a workpiece, servo means for controlling the gap spacing including a reversible motive means and an electrically energized element operatively connected to and controlling said motive means responsive to direction of current flow through said element wherein the improvement comprises a reference voltage source connected to one terminal of said element, a parallel resistor-capacitor network, said network connected in series between the other terminal of said element and one terminal of said gap, said resistor of relatively high magnitude to provide delayed backup on gap short circuit and to improve stability of downfeed.

5. In an electrical discharge machining apparatus for providing variable on-off time machining power pulses across a dielectric coolant filled gap between a tool electtrode and a workpiece, servo means for controlling the gap spacing including a reversible motive means and an electrically enregized element operatively connected to and controlling said motive means responsive to direction of current flow through said element wherein the improvement comprises a reference voltage source, said element connected in series with a coupling capacitor between said reference voltage source and said gap, and a blocking diode and a resistor connected in parallel combination, said parallel combination connected across the series combination of said coupling capacitor and said gap.

6. In an electrical discharge machining apparatus having an electronic switch periodically operated to provide variable on-off time machining power pulses across a dielectric coolant filled gap between a tool electrode and a workpiece, servo means for controlling the gap spacing including a reversible motive means and an electrically energized element for controlling operation of said motive means relative to direction of current flow through said element, wherein the improvement comprises a reference voltage source, a variable resistor connected between said source and one terminal of said element, the other terminal of said element operatively connected to said gap, and a control means operatively connected to said switch for selectively varying its on-time, said control means operatively connected to said variable resistor and operable to increase the magnitude of said resistor conjointly with the increase of said on-time of said switch.

7. In an electrical discharge machining apparatus having an electronic switch of variable on-off time, said switch operatively connected between a power source and a dielectric coolant filled gap between a tool electrode and a workpiece to provide machining power pulses thereacross, servo means for controlling the gap spacing including a reservible motive means and an electrically energized element for controlling operation of said motive means responsive to direction of current flow through said element, wherein the improvement comprises a reference voltage source, a rheostat having its variable resistor connected in series between said source and one terminal of said element, the other terminal of said element operatively connected to said gap for receiving a voltage signal representative of an electrical characteristic of the gap and of gap spacing, and a manually operated control means operatively connected to and controlling the on-off time of said switch, said control means operatively connected to the movable contact of said rheostat for increasing the magnitude of its resistor in series with said element responsive to increase of said switch on-time and for decreasing the magnitude of resistance in series with said element responsive to decrease of said switch on-time.

8. In an electrical discharge machining apparatus having an electronic switch of variable on-off time, said switch operatively connected with its control electrodes coupled between a power source and a dielectric coolant filled gap between a tool electrode and a workpiece to provide machining power pulses thereacross, servo means for controlling gap spacing, a reversible motive means and an electrically energized element for controlling operation of said motive means responsive to direction of current flow through said element, wherein the improvement comprises a reference voltage source, a variable impedance network between said source and one terminal of said element, a sensing network connected between said gap and the other terminal of said element for providing a voltage signal thereto representative of gap voltage and gap spacing, and a control manual switching means operatively connected to said electronic switch for increasing or decreasing its on-time and operatively connected to said variable impedance network for proportionately increasing or decreasing the impedance thereof.

9. The combination as set forth in claim 8 wherein a multivibrator is connected in circuit with said electronic switch for operating it and controlling its on-time, said multivibrator including a pair of electronic switching means, each having its control electrode connected to a different resistor-capacitor network, a control switching means comprising a potentiometer coupled to both said networks for increasing the magnitude of one of said resistors and correspondingly decreasing the magnitude of the other of said resistors to vary pulse on-time and wherein said control switching means includes a rheostat operated in tandem with said first mentioned potentiometer for varying said impedance of said variable impedance network.

10. The combination as set forth in claim 8 wherein at least one electronic switch is operatively connected to the control electrode of said first-mentioned electronic switch for periodically turning it on and off, and wherein a variable time constant R-C network is operatively connected to and controlling said last mentioned electronic switch, said control means comprising a potentiometer for varying the time constant of said R-C network and therefore varying the on-time of both said electronic switches, said control means including a rheostat ganged for operation conjointly with said potentiometer, said rheostat operative to vary said impedance of said variable impedance network.

References Cited

UNITED STATES PATENTS 2,984,761  5/1961  Webb.
3,062,985  11/1962  Webb.

RALPH F. STAUBLY, Primary Examiner